US009538385B2

(12) United States Patent
Caldwell et al.

(10) Patent No.: US 9,538,385 B2
(45) Date of Patent: Jan. 3, 2017

(54) METHOD AND APPARATUS FOR THE DETECTION OF UNLICENSED USER EQUIPMENT

(75) Inventors: George Caldwell, Brasilia (BR); Daniel Favero, Kirkland, WA (US); Alexandre Jose Figueiredo Loureiro, Brasilia (BR); Rogério Pessanha Lobato, Brasilia (BR)

(73) Assignee: Nokia Technologies Oy, Espoo (FI)

( * ) Notice: Subject to any disclaimer, the term of this patent is extended or adjusted under 35 U.S.C. 154(b) by 0 days.

(21) Appl. No.: 14/123,572

(22) PCT Filed: Jun. 7, 2011

(86) PCT No.: PCT/IB2011/052466
§ 371 (c)(1),
(2), (4) Date: Dec. 3, 2013

(87) PCT Pub. No.: WO2012/168761
PCT Pub. Date: Dec. 13, 2012

(65) Prior Publication Data
US 2014/0099928 A1 Apr. 10, 2014

(51) Int. Cl.
*H04W 12/12* (2009.01)
*H04W 48/02* (2009.01)
(Continued)

(52) U.S. Cl.
CPC ............ *H04W 12/12* (2013.01); *H04W 48/02* (2013.01); *H04L 63/0876* (2013.01); *H04W 8/18* (2013.01)

(58) Field of Classification Search
CPC ........ H04W 12/12; H04W 8/18; H04W 48/02; H04L 63/0876
(Continued)

(56) References Cited

U.S. PATENT DOCUMENTS 5,978,669 A * 11/1999 Sanmugam ........... H04W 12/12
455/410
6,072,806 A * 6/2000 Khouri .................... H04L 29/06
370/228
(Continued)

FOREIGN PATENT DOCUMENTS

EP 0711090 A2 5/1996
EP 1720290 A1 11/2006
(Continued)

OTHER PUBLICATIONS

International Search Report and Written opinion received in corresponding Patent Cooperation Treaty Application No. PCT/IB2011/052466. Dated Mar. 19, 2012. 13 pages.
(Continued)

*Primary Examiner* — Nathan Taylor
(74) *Attorney, Agent, or Firm* — Mintz Levin Cohn Ferris Glovsky and Popeo, P.C.

(57) ABSTRACT

An apparatus for the detection of unlicensed user equipment may include a processor and memory storing executable computer program code that cause the apparatus to at least perform operations including receiving user equipment capabilities from a user equipment and comparing the received user equipment capabilities with the expected user equipment capabilities. The expected user equipment capabilities may be obtained based on a user equipment identifier received from the user equipment. The processor and memory storing computer program code may further cause the apparatus to send a notification if the compared user equipment capabilities are different. Corresponding methods and computer program products are also provided.

14 Claims, 8 Drawing Sheets

(51) Int. Cl.
*H04L 29/06* (2006.01)
*H04W 8/18* (2009.01)

(58) Field of Classification Search
USPC .......................................................... 455/411
See application file for complete search history.

(56) References Cited

U.S. PATENT DOCUMENTS

| | | | |
|---|---|---|---|
| 6,236,852 B1* | 5/2001 | Veerasamy | H04W 12/06 380/248 |
| 2002/0120873 A1* | 8/2002 | Salmivalli | H04W 12/12 726/32 |
| 2005/0282584 A1 | 12/2005 | Faisy | |
| 2007/0224990 A1* | 9/2007 | Edge | H04W 8/24 455/436 |
| 2009/0201916 A1* | 8/2009 | Caron | H04L 12/66 370/352 |
| 2009/0305668 A1* | 12/2009 | Ahn | H04W 12/12 455/410 |
| 2010/0330959 A1* | 12/2010 | Mildh | H04W 8/22 455/410 |
| 2011/0085447 A1* | 4/2011 | Kholaif | H04W 12/04 370/242 |
| 2012/0039312 A1* | 2/2012 | Narkar | H04W 8/00 370/338 |
| 2014/0099928 A1* | 4/2014 | Caldwell | H04W 48/02 455/411 |

FOREIGN PATENT DOCUMENTS

| | | |
|---|---|---|
| EP | 1860858 A1 | 11/2007 |
| WO | 0078076 A1 | 12/2000 |

OTHER PUBLICATIONS

Mci et al. "Corrections to clause 8.1". 3GPP TSG T1 Meeting #14, TI-020043. Sophia Antipolis, France. Feb. 21, 2002.
Ericsson. "Handling of UE capability information in SAE/LTE". 3GPP TSG-RAN WG2, R2-071328. St. Julian, Malta. Mar. 2007.

\* cited by examiner

METHOD AND APPARATUS FOR THE DETECTION OF UNLICENSED USER EQUIPMENT

RELATED APPLICATION

This application was originally filed as PCT Application No. PCT/IB2011/052466 filed Jun. 07, 2011.

TECHNOLOGICAL FIELD

Example embodiments of the present invention relate generally to communications technology and, more particularly, relate to a method and apparatus for the detection of unlicensed user equipment.

BACKGROUND

The modern communications era has brought about a tremendous expansion of wireline and wireless networks. Wireless and mobile networking technologies have addressed related consumer demands, while providing more flexibility and immediacy of information transfer. Concurrent with the expansion of networking technologies, an expansion in computing power has resulted in development of affordable computing devices capable of taking advantage of services made possible by modern networking technologies. This expansion in computing power has led to a reduction in the size of computing devices and given rise to a new generation of user equipment that are capable of performing functionality that only a few years ago required processing power that could be provided only by the most advanced desktop computers. Consequently, mobile computing devices having a small form factor have become ubiquitous and are used to access network applications and services by consumers of all socioeconomic backgrounds.

A growing concern is the availability of unlicensed user equipment, which may have design flaws, manufacturing defects, and may be produced using substandard components. Such products may undergo little or no testing for compliance with safety standards and/or networking standards. It has been reported that some unlicensed user equipment may adversely affect network performance. It has also been reported that some unlicensed user equipment have posed a risk of injury and/or other health risks to persons who use such products.

BRIEF SUMMARY

A method and apparatus are herein provided for the detection of unlicensed user equipment. In this regard, methods and apparatuses are provided that may provide several advantages and/or effects to computing devices, computing device users, vendors, and network operators. According to some example embodiments, when an unlicensed user equipment is detected, a warning message may be sent to the user equipment. According to some example embodiments, when an unlicensed user equipment is detected, a notification may be sent to disable a subscriber profile associated with the unlicensed user equipment. According to some example embodiments, a notification may be sent indicating that the unlicensed user equipment should not be allowed to access a network.

According to some example embodiments, a method is provided, comprising receiving a first message comprising a first at least one user equipment capability, comparing the first at least one user equipment capability with a second at least one user equipment capability and, in an instance in which the first at least one user equipment capability and the second at least one user equipment capability are different, sending a notification. According to some example embodiments, the first message is further associated with a first communication link identifier and the method further comprises receiving a second message comprising a user equipment identity, wherein the second message is associated with a second communication link identifier, comparing the first communication link identifier with the second communication link identifier, and in an instance in which the first communication link identifier and the second communication link identifier match, obtaining the second at least one user equipment capability associated with the user equipment identity. According to some example embodiments, sending a notification comprises sending a warning message to a user equipment associated with the user equipment identity. According to some example embodiments, sending a notification comprises sending a request to disable a subscriber profile associated with the user equipment identity. According to some example embodiments, sending a notification comprises sending an indication that a user equipment associated with the user equipment identity should not be allowed to access a network. According to some example embodiments, sending a notification comprises sending an indication that a user equipment associated with the user equipment identity should have limited access to a network.

According to some example embodiments, an apparatus is provided comprising at least one processor and at least one memory including computer program code. The at least one memory including computer program code are configured to, with the at least one processor, cause the apparatus at least to receive a first message comprising a first at least one user equipment capability, compare the first at least one user equipment capability with a second at least one user equipment capability, and send a notification in an instance in which the first at least one user equipment capability and the second at least one user equipment capability are different. According to some example embodiments, the first message is further associated with a first communication link identifier and the apparatus further comprises at least one memory including computer program code configured to, with the at least one processor, further cause the apparatus to receive a second message comprising a user equipment identity, wherein the second message is associated with a second communication link identifier, compare the first communication link identifier with the second communication link identifier and obtain the second at least one user equipment capability associated with the user equipment identity in an instance in which the first communication link identifier and the second communication link identifier match. According to some example embodiments, the notification comprises a warning message sent to a user equipment associated with the user equipment identity, the warning message comprising an indication that the user equipment identity is counterfeit. According to some example embodiments, the notification comprises a request to disable a user profile associated with the user equipment identity. According to some example embodiments, the notification comprises an indication that a user equipment associated with the user equipment identity should not be allowed to access a network. According to some example embodiments, the notification comprises an indication that a user equipment associated with the user equipment identity should have limited access to a network.

According to some example embodiments, an apparatus is provided, comprising means for receiving a first message comprising a first at least one user equipment capability, means for comparing the first at least one user equipment capability with a second at least one user equipment capability, and means for sending a notification in an instance in which the first at least one user equipment capability and the second at least one user equipment capability are different. According to some example embodiments, the first message is further associated with a first communication link identifier and the apparatus further comprises means for receiving a second message comprising a user equipment identity, wherein the second message is associated with a second communication link identifier, means for comparing the first communication link identifier with the second communication link identifier, and means for obtaining the second at least one user equipment capability associated with the user equipment identity in an instance in which the first communication link identifier and the second communication link identifier match. According to some example embodiments, sending the notification comprises sending a warning message to a user equipment associated with the user equipment identity. According to some example embodiments, sending the notification comprises sending a request to disable a subscriber profile associated with the user equipment identity. According to some example embodiments, sending the notification comprises sending an indication that a user equipment associated with the user equipment identity should not be allowed to access a network. According to some example embodiments, sending the notification comprises sending an indication that a user equipment associated with the user equipment identity should have limited access to a network.

The above summary is provided merely for purposes of summarizing some example embodiments of the invention so as to provide a basic understanding of some aspects of the invention. Accordingly, it will be appreciated that the above described example embodiments are merely examples and should not be construed to narrow the scope or spirit of the invention in any way. It will be appreciated that the scope of the invention encompasses many potential embodiments, some of which will be further described below, in addition to those here summarized.

BRIEF DESCRIPTION OF THE DRAWINGS

Figure 1:
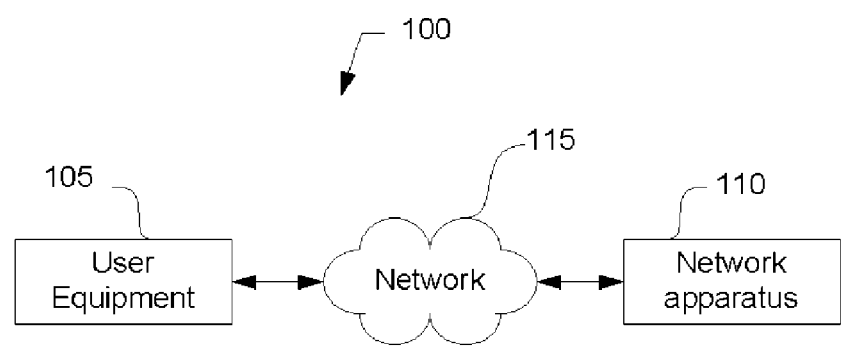
Figure 2:
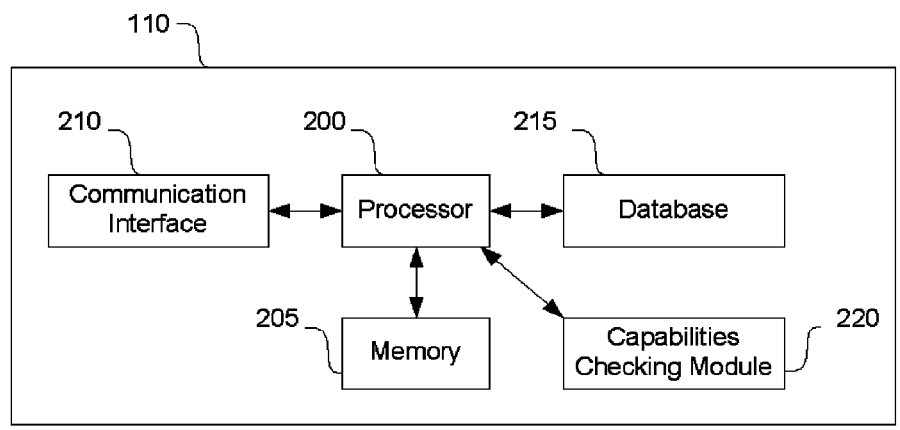
Figure 3:
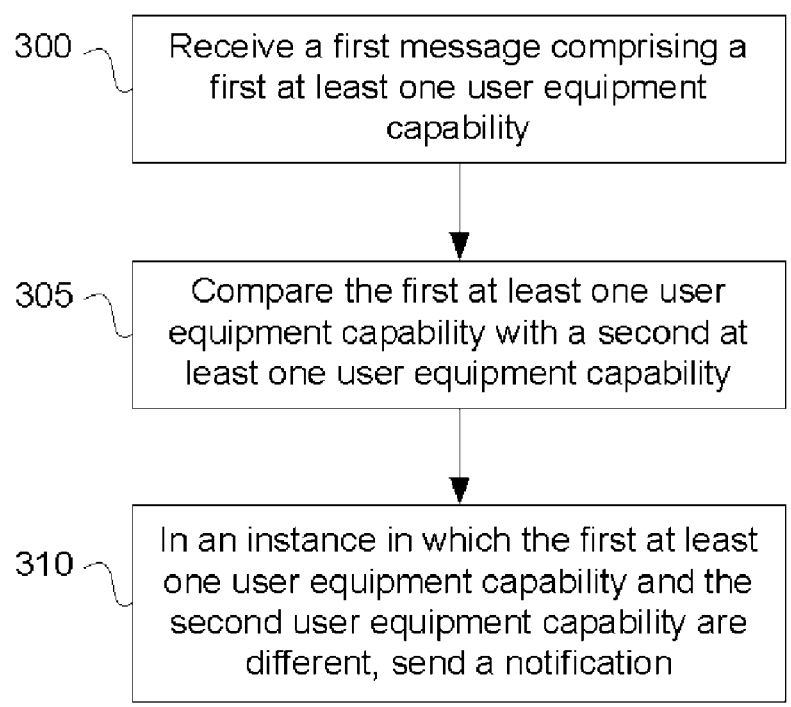
Figure 4:
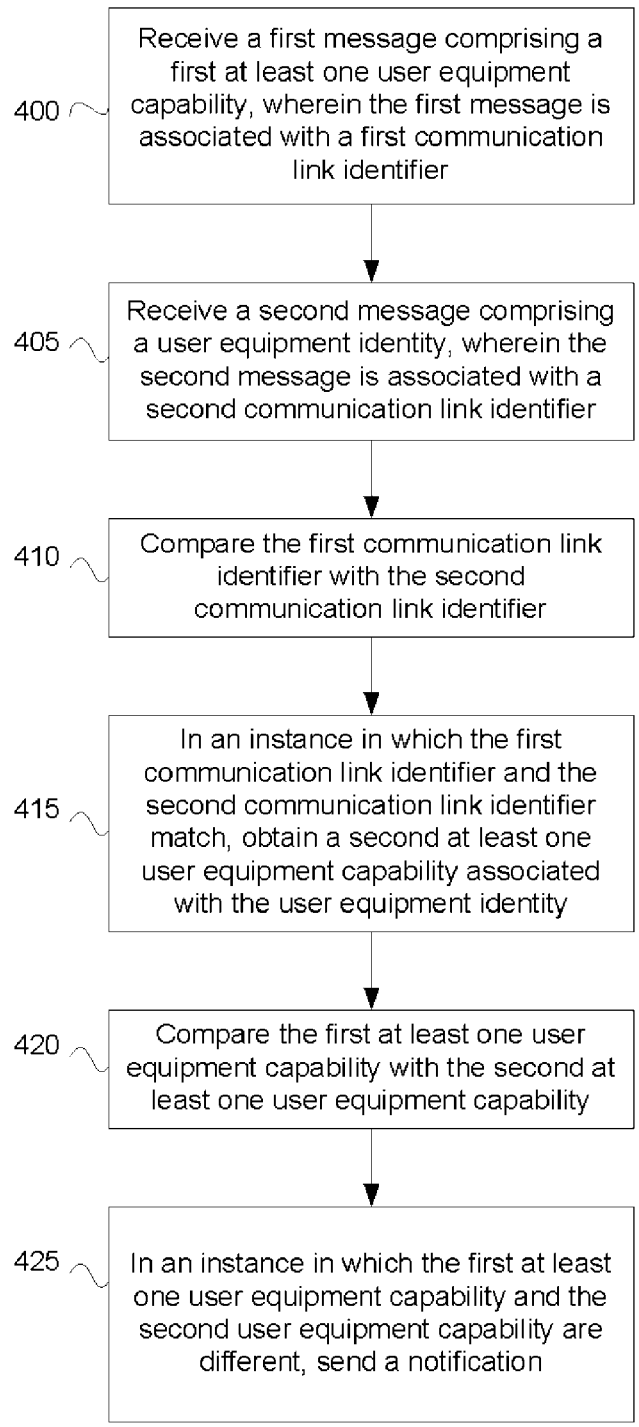
Figure 5:
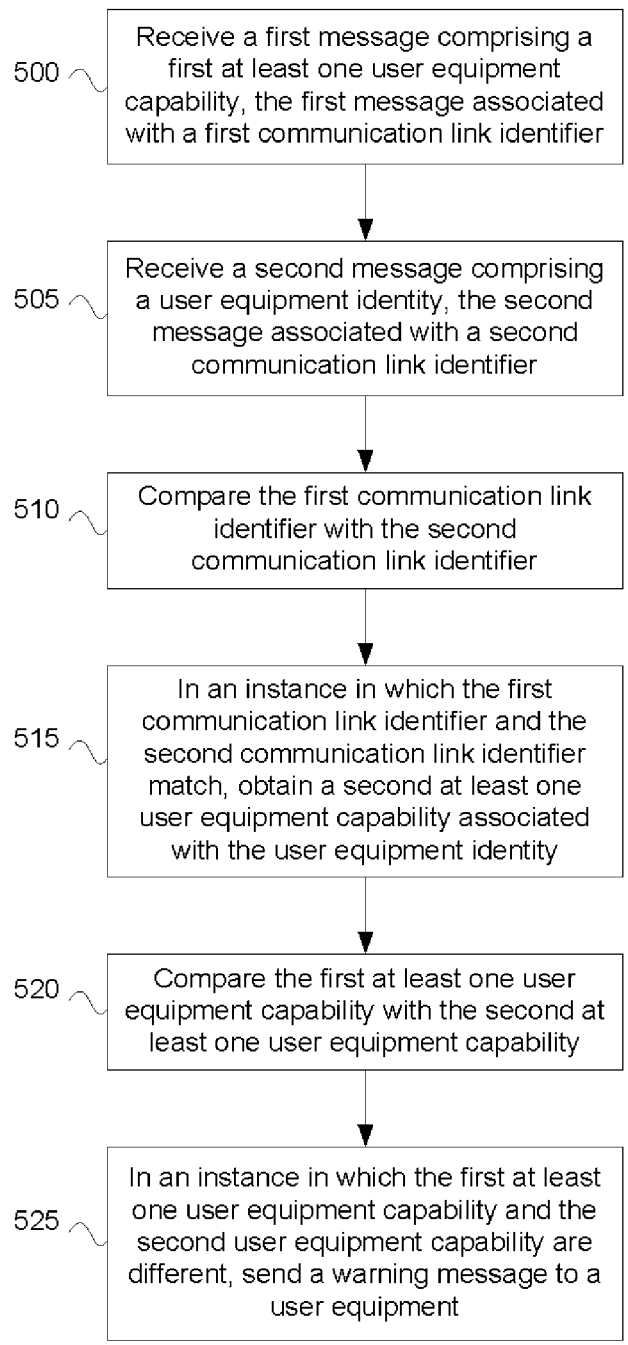
Figure 6:
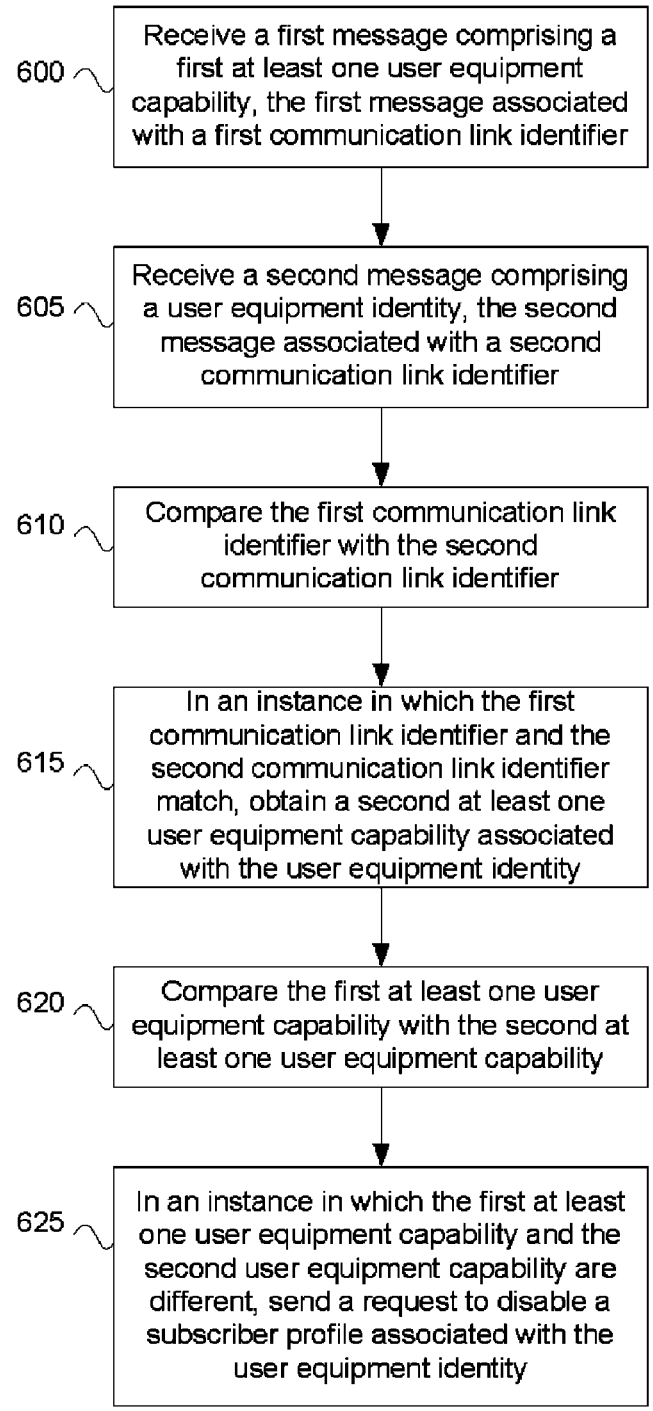

Having thus described example embodiments of the invention in general terms, reference will now be made to the accompanying drawings, which are not necessarily drawn to scale, and wherein:

FIG. 1 illustrates a system for the detection of unlicensed user equipment according to some example embodiments of the invention;

FIG. 2 is a schematic block diagram of a network apparatus according to some example embodiments of the invention;

FIG. 3 illustrates a flowchart according to an example method for the detection of unlicensed user equipment according to some example embodiments of the invention;

FIG. 4 illustrates a flowchart according to an example method for the detection of unlicensed user equipment according to some example embodiments of the invention;

FIG. 5 illustrates a flowchart according to an example method for the detection of unlicensed user equipment according to some example embodiments of the invention; and FIG. 6 illustrates a flowchart according to an example method for the detection of unlicensed user equipment according to some example embodiments of the invention.

Figure 7:
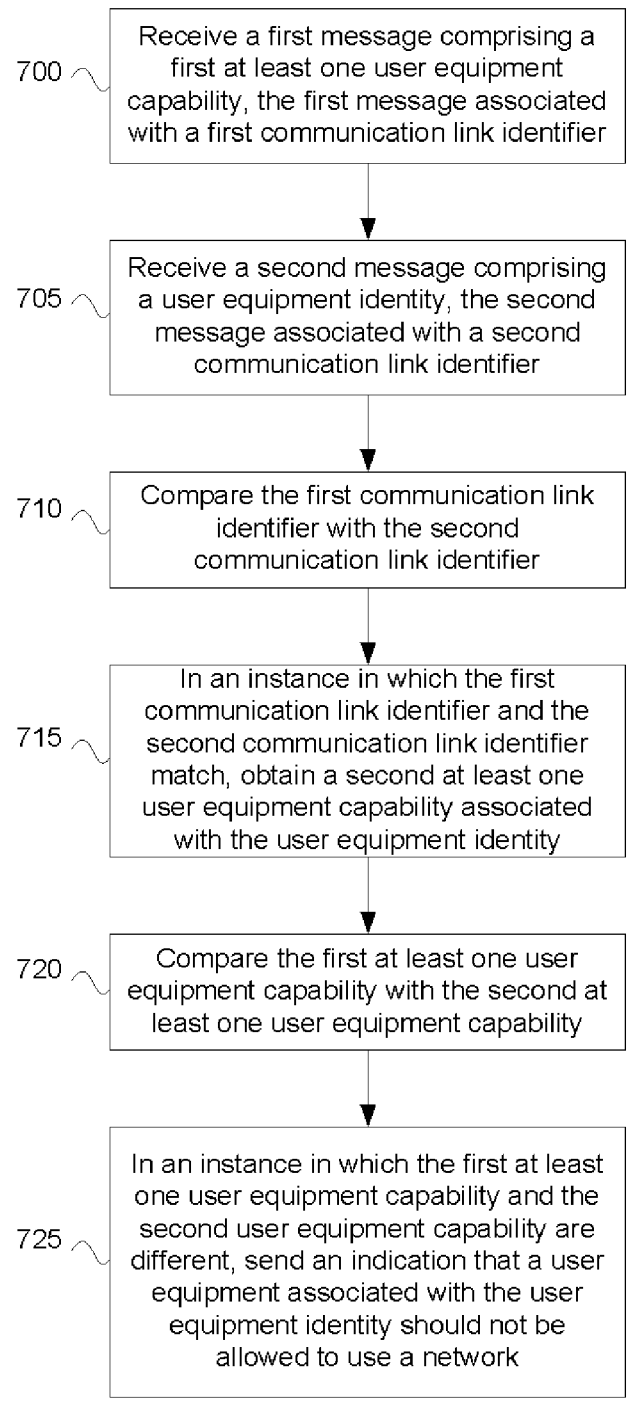

FIG. 7 illustrates a flowchart according to an example method for the detection of unlicensed user equipment according to some example embodiments of the invention.

Figure 8:
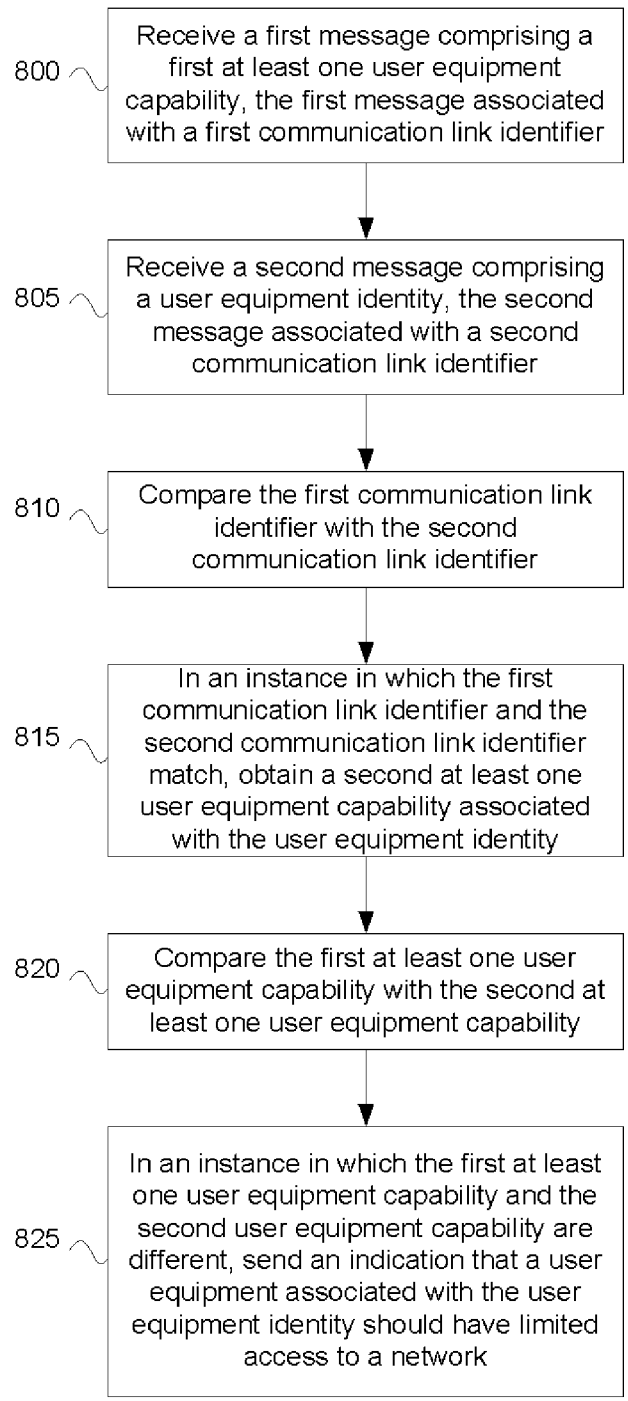

FIG. 8 illustrates a flowchart according to an example method for the detection of unlicensed user equipment according to some example embodiments of the invention.

DETAILED DESCRIPTION

Some example embodiments of the present invention will now be described more fully hereinafter with reference to the accompanying drawings, in which some embodiments of the invention are shown. The invention may be embodied in many different forms and should not be construed as limited to the embodiments set forth herein; rather, these embodiments are provided so that this disclosure will satisfy applicable legal requirements. Like reference numerals refer to like elements throughout.

As used herein, the terms "data," "content," "information" and similar terms may be used interchangeably to refer to data capable of being transmitted, received, displayed and/or stored in accordance with various example embodiments. Thus, use of any such terms should not be taken to limit the spirit and scope of the disclosure. Further, where a computing device is described herein to receive data from another computing device, it will be appreciated that the data may be received directly from the another computing device or may be received indirectly via one or more intermediary computing devices such as, for example, one or more servers, relays, routers, network access points, base stations, and/or the like.

The term "computer-readable medium" as used herein refers to any medium configured to participate in providing information to a processor, including instructions for execution. Such a medium may take many forms, including, but not limited to a non-transitory computer-readable storage medium (for example, non-volatile media, volatile media), and transmission media. Transmission media may include, for example, coaxial cables, copper wire, fiber optic cables, and carrier waves that travel through space without wires or cables such as, for example, acoustic waves and electromagnetic waves, including radio, optical and infrared waves. Signals may include, for example, man-made transient variations in amplitude, frequency, phase, polarization or other physical properties transmitted through the transmission media. Examples of computer-readable media may include a floppy disk, a flexible disk, hard disk, magnetic tape, any other magnetic medium, a compact disc read only memory (CD-ROM), compact disc compact disc-rewritable (CD-RW), digital versatile disc (DVD), Blu-Ray, any other optical medium, punch cards, paper tape, optical mark sheets, any other physical medium with patterns of holes or other optically recognizable indicia, a random access memory (RAM), a programmable read only memory (PROM), an erasable programmable read only memory (EPROM), a FLASH-EPROM, any other memory chip or cartridge, a carrier wave, or any other medium from which a computer can read. However, it will be appreciated that where embodiments are described to use a computer-readable storage medium, other types of computer-readable mediums may be substituted for or used in addition to the computer-readable storage medium in alternative embodiments.

Additionally, as used herein, the term 'circuitry' refers to (a) hardware-only circuit implementations (for example, implementations in analog circuitry and/or digital circuitry); (b) combinations of circuits and computer program product(s) comprising software and/or firmware instructions stored on one or more computer readable memories that work together to cause an apparatus to perform one or more functions described herein; and (c) circuits such as, for example, a microprocessor(s) or a portion of a microprocessor(s), that require software or firmware for operation even if the software or firmware is not physically present. This definition of 'circuitry' applies to all uses of this term herein, including in any claims. As a further example, as used herein, the term 'circuitry' also includes an implementation comprising one or more processors and/or portion(s) thereof and accompanying software and/or firmware. As another example, the term 'circuitry' as used herein also includes, for example, a baseband integrated circuit or applications processor integrated circuit for a mobile phone or a similar integrated circuit in a server, a cellular network device, other network device, and/or other computing device.

According to some example embodiments, a user equipment (UE) may be embodied as any computing device such as, for example, a computer, laptop computer, mobile terminal, mobile computer, mobile phone, mobile communication device, game device, digital camera/camcorder, audio/video player, television device, radio receiver, digital video recorder, positioning device, wrist watch, portable digital assistant (PDA), a chipset, an apparatus comprising a chipset, any combination thereof, and/or the like. According to some example embodiments, a UE may be configured with one or more user equipment identities (UE IDs) such as, for example, an International Mobile Equipment Identity (IMEI), IMEI and Software Version (IMEISV), Mobile Equipment Identifier (MEID), Electronic Serial Number (ESN), and/or the like. According to some example embodiments, a UE may also be configured with one or more subscriber identities (subscriber IDs) such as, for example, an International Mobile Subscriber Identity (IMSI), Mobile Identification Number (MIN), Mobile Directory Number (MDN), and/or the like. According to some example embodiments, a UE may be configured with at least one UE capability. According to some example embodiments, UE capability may comprise a parameter that describes one or more properties, capabilities or functions of a UE which does not change over time and may be communicated to a network. UE capabilities may include, for example, the frequency bands supported by a UE, network protocols supported by the UE, power control algorithms supported by the UE, coder/decoders (codecs) supported by the UE, and/or the like. The network may make use of UE capabilities to make decisions about how to communicate with a UE and which network resources may be accessed by the UE. A UE may not be able to function properly if it reports incorrect UE capabilities to the network. For example, if the UE incorrectly reports that it supports a particular codec, the network may later attempt to set up a voice call using that codec and the call may fail.

A licensed UE may be produced by a licensed manufacturer, such as a manufacturer which has been licensed by an authorized body. The authorized body may be, for example, a Global System for Mobile Communications (GSM) Approval Center. The authorized body may allocate a range of legitimate UE IDs for use by the licensed manufacturer. On the other hand, an unlicensed UE may be produced by an unlicensed manufacturer which has not been licensed by an authorized body. As such, the unlicensed manufacturer may not have access to legitimate UE IDs for use in its products. Instead, the unlicensed manufacturer, its distributors and/or customers may configure an unlicensed UE with a counterfeit UE ID such as, for example, a UE ID which may already belong to another, licensed UE, or a UE ID which may already be allocated to a licensed manufacturer.

Some networks may be configured to detect the presence of lost or stolen UEs, but may not be able to detect the presence of unlicensed UEs. For example, when a UE attempts to access a network, the UE may be required to send its UE ID to the network. One or more nodes of the network may receive the UE ID and check it against a database of UE IDs in order to determine whether the UE has been reported lost or stolen. For example, the UE ID may be received by an Equipment Identity Register (EIR) or Central Equipment Identity Register (CEIR) which may determine whether the UE ID appears on a white list. If the UE ID appears on the white list the UE is not considered lost or stolen and may be allowed access to the network. In some cases, an unlicensed UE may thus be allowed access to the network because the unlicensed UE is configured with a counterfeit UE ID. A network apparatus configured according to some example embodiments of the present invention may be used to detect the presence of unlicensed UEs and limit or prevent such UEs from accessing a network, thus mitigating some of the risks and adverse effects associated with the use of unlicensed user equipment.

Referring now to FIG. 1, FIG. 1 illustrates a block diagram of a system 100 which has been configured to detect unlicensed user equipment according to some example embodiments of the present invention. It will be appreciated that the system of FIG. 1 as well as the illustrations in other figures are each provided as an example of some embodiments and should not be construed to narrow the scope or spirit of the disclosure in any way. In this regard, the scope of the disclosure encompasses many potential embodiments in addition to those illustrated and described herein. As such, while FIG. 1 illustrates one example of a configuration of a system for the detection of unlicensed user equipment, numerous other configurations may also be used to implement embodiments of the present invention.

As shown in FIG. 1, according to some example embodiments, the system 100 may include one or more UEs 105, and one or more network apparatuses 110 which may be configured to communicate with each other via a network 115. The network 115 may comprise one or more wireless networks (for example, a cellular network, wireless local area network, wireless personal area network, wireless metropolitan area network, and/or the like), one or more wireline networks, or some combination thereof, and in some embodiments may comprise at least a portion of the internet.

The UE 105 may be embodied as any computing device such as, for example, a computer, laptop computer, mobile terminal, mobile computer, mobile phone, mobile communication device, game device, digital camera/camcorder, audio/video player, television device, radio receiver, digital video recorder, positioning device, wrist watch, PDA, a chipset, an apparatus comprising a chipset, any combination thereof, and/or the like. The UE 105 is configured with one or more UE IDs such as, for example, an IMEI, IMEISV, MEID, and/or ESN. The UE 105 is also configured with at least one UE capability. The UE 105 may be configured to communicate with other devices of the system 100 via the network 115.

The network apparatus 110 may be embodied as one or more servers, a server cluster, a cloud computing infrastructure, one or more desktop computers, one or more laptop computers, one or more network nodes, multiple computing devices in communication with each other, a chipset, an apparatus comprising a chipset, any combination thereof, and/or the like. The network apparatus 110 may be configured to detect unlicensed UEs according to embodiments of the present invention. The network apparatus 110 may be configured to communicate with other devices of the system 100 via the network 115.

Referring now to FIG. 2, FIG. 2 illustrates a block diagram of a network apparatus 110 according to some example embodiments. According to some example embodiments, the network apparatus 110 may include various means for performing the various functions herein described. The network apparatus 110 may comprise one or more of a processor 200, memory 205, communication interface 210, database 215, or capabilities checking module 220. The network apparatus 110 as described herein may be embodied as, for example, circuitry, hardware elements (for example, a suitably programmed processor, combinational logic circuit, and/or the like), a computer program product comprising computer-readable program instructions (for example, software or firmware) stored on a computer-readable medium (for example memory 205) that is executable by a suitably configured processing device (for example, the processor 200), or some combination thereof.

According to some example embodiments, one or more of the means illustrated in FIG. 2 may be embodied as a chip or chip set. In other words, the network apparatus 110 may comprise one or more physical packages (for example, chips) including materials, components and/or wires on a structural assembly (for example, a baseboard). The structural assembly may provide physical strength, conservation of size, and/or limitation of electrical interaction for component circuitry included thereon. In this regard, the processor 200, memory 205, communication interface 210, database 215, and/or capabilities checking module 220 may be embodied as a chip or chip set. The network apparatus 110 may therefore be configured to implement embodiments of the present invention on a single chip or as a single "system on a chip." As another example, according to some example embodiments, the network apparatus 110 may comprise component(s) configured to implement embodiments of the present invention on a single chip or as a single "system on a chip." As such, in some cases, a chip or chipset may be configured to perform one or more operations for providing the functionalities described herein and/or for enabling user interface navigation with respect to the functionalities and/or services described herein.

The processor 200 may be embodied as various means including, for example, one or more microprocessors with accompanying digital signal processor(s), one or more processor(s) without an accompanying digital signal processor, one or more coprocessors, one or more multi-core processors, one or more controllers, processing circuitry, one or more computers, various other processing elements including integrated circuits such as, for example, an application specific integrated circuit (ASIC) or field programmable gate array (FPGA), one or more other hardware processors, or some combination thereof. Accordingly, although illustrated in FIG. 2 as a single processor, according to some example embodiments the processor 200 may comprise a plurality of processors. The plurality of processors may be in operative communication with each other and may be collectively configured to perform one or more functionalities of the network apparatus 110 as described herein. The plurality of processors may be embodied on a single computing device or distributed across a plurality of computing devices collectively configured to function as the network apparatus 110. According to some example embodiments, the processor 200 is configured to execute instructions stored in the memory 205 or otherwise accessible to the processor 200. These instructions, when executed by the processor 200, cause the network apparatus 110 to perform one or more of the functionalities of the network apparatus 110 as described herein. As such, whether configured by hardware or software methods, or by a combination thereof the processor 200 may comprise an entity capable of performing operations according to embodiments of the present invention while configured accordingly. Thus, for example, when the processor 200 is embodied as an ASIC, FPGA and/or the like, the processor 200 may comprise specifically configured hardware for conducting one or more operations described herein. Alternatively, as another example, when the processor 200 is embodied as an executor of instructions such as instructions stored in the memory 205, the instructions may specifically configure the processor 200 to perform one or more algorithms and operations described herein.

The memory 205 may comprise, for example, volatile memory, non-volatile memory, or some combination thereof In this regard, the memory 205 may comprise a non-transitory computer-readable storage medium. Although illustrated in FIG. 2 as a single memory, the memory 205 may comprise a plurality of memories. The plurality of memories may be embodied on a single computing device or may be distributed across a plurality of computing devices collectively configured to function as the network apparatus 110. In various example embodiments, the memory 205 may comprise a hard disk, random access memory, cache memory, flash memory, a CD-ROM, digital versatile disc read only memory (DVD-ROM), an optical disc, circuitry configured to store information, or some combination thereof. The memory 205 may be configured to store information, data, applications, instructions, and/or the like for enabling the network apparatus 110 to carry out various functions in accordance with various example embodiments. For example, according to some example embodiments, the memory 205 may be configured to buffer input data for processing by the processor 200. Additionally or alternatively, the memory 205 may be configured to store program instructions for execution by the processor 200. The memory 205 may store information in the form of static and/or dynamic information. This stored information may be stored and/or used by the communication interface 210, the database 215, and/or the capabilities checking module 220 during the course of performing their respective functionalities.

The communication interface 210 may be embodied as any device or means embodied in circuitry, hardware, a computer program product comprising computer readable program instructions stored on a computer readable medium (for example, the memory 205) and executed by a processing device (for example, the processor 200), or a combination thereof that is configured to receive and/or transmit data from/to another device. According to some example embodiments, the communication interface 210 may be at least partially embodied as or otherwise controlled by the processor 200. In this regard, the communication interface 210 may be in communication with the processor 200. This communication may take place, for example, via a bus. The communication interface 210 may include, for example, an antenna, a transmitter, a receiver, a transceiver and/or supporting hardware or software for enabling communications with one or more remote devices. The communication interface 210 may be configured to receive and/or transmit data using any protocol that may be used for communications between devices. In this regard, the communication interface 210 may be configured to receive and/or transmit data using any protocol that may be used for transmission of data over a wireless network, wireline network, some combination thereof, and/or the like, by which the network apparatus 110 and one or more devices or computing resources may be in communication. As an example, the communication interface 210 may be configured to enable communication between the network apparatus 110 and a UE 105 over a network 115. The communication interface 210 may additionally be in communication with the memory 205, database 215, and/or capabilities checking module 220. This communication may take place, for example, via a bus.

The database 215 may be embodied as various means such as, for example, circuitry, hardware, a computer program product comprising computer readable program instructions stored on a computer readable medium (for example, the memory 205) and executed by a processing device (for example, the processor 200), or some combination thereof and, according to some example embodiments, may be embodied as or otherwise controlled by the processor 200. In embodiments wherein the database 215 is embodied separately from the processor 200, the database 215 may be in communication with the processor 200. The database 215 may further be in communication with one or more of the memory 205, communication interface 210, and/or capabilities checking module 220. This communication may take place, for example, via a bus. The database 215 may comprise, for example, volatile memory, non-volatile memory, or some combination thereof In this regard, the database 215 may comprise a non-transitory computer-readable storage medium. Although illustrated in FIG. 2 as a single database, the database 215 may comprise a plurality of databases. The plurality of databases may be embodied on a single computing device or may be distributed across a plurality of computing devices collectively configured to function as the network apparatus 110. In various example embodiments, the database 215 may comprise a hard disk, random access memory, cache memory, flash memory, a CD-ROM, DVD-ROM, an optical disc, circuitry configured to store information, or some combination thereof. The database 215 may be configured to store information, data, applications, instructions, and/or the like, for enabling the network apparatus 110 to carry out various functions in accordance with various example embodiments. For example, according to some example embodiments, the database 215 may be configured to fetch, store, query, modify, and/or delete information. The database 215 may be configured to store information in the form of static and/or dynamic information. This stored information may be stored and/or used by the network apparatus 110 during the course of performing its functionalities. The database 215 may additionally be in communication with the memory 205, communication interface 210 and/or capabilities checking module 220. This communication may take place, for example, via a bus.

The capabilities checking module 220 may be embodied as various means such as, for example, circuitry, hardware, a computer program product comprising computer readable media (for example, the memory 205) including computer program instructions and executed by a processing device (for example, the processor 200), or some combination thereof and, in some example embodiments, may be embodied as or otherwise controlled by the processor 200. In embodiments wherein the capabilities checking module 220 is embodied separately from the processor 200, the capabilities checking module 220 may be in communication with the processor 200. The capabilities checking module 220 may further be in communication with the memory 205, communication interface 210 and/or database 215. This communication may take place, for example, via a bus.

According to some example embodiments, the system 100 may be configured to operate according to one or more standards such as, for example, the $3^{rd}$ Generation Partnership Project (3GPP) GSM, Universal Mobile Telecommunications System (UMTS) or Long Term Evolution (LTE) standards. According to this example, the system 100 may comprise a Mobility Switching Controller/Visitor Location Register (MSC/VLR) and/or Mobility Management Entity (MME), either of which may be considered an example of a network apparatus 110. In order to access the network resources of a network 115, the UE 105 sends a message to the network apparatus 110 (for example, the MSC/VLR or MME) containing at least one UE capability. For example, as described in 3GPP Technical Specification (TS) 24.008, during a Location Update Procedure, the UE 105 sends a Location Updating Request to the MSC/VLR or MME. The Location Updating Request contains a Mobile station classmark information element. As shown in Table 1, the Mobile Station Classmark information element contains a number of UE capabilities, including A5/1 encryption algorithm availability, radio frequency (RF) power capability class, the presence of Packet Switched (PS) capability, and the like.

TABLE 1

A Mobile Station Classmark information element

Mobile Station Classmark 2
Length: 3 (03 h)
Revision Level: Supporting R99 or later versions (02 h)
Controlled Early Classmark: Sending implemented (1)
A5/1: Encryption algorithm A5/1 available (0)
RF Power Capability: Class 1 (01 h)
PS Capability: Present (1)
SS Screening: Ellipsis notation and phase 2 error handling (01 h)
Short Message Capability: Present (1)
VBS: No capability or no notifications wanted (0)
VGCS: No capability or no notifications wanted (0)
Frequency Capability: MS does not support the E-GSM or R-GSM band (0)
Classmark 3: MS supports options indicated in Classmark 3 (1)
LCS VA Capability
Location request notification via CS domain not supported (0)
UCS2 Treatment: The ME has a preference (1)
SoLSA: The ME does not support SoLSA (0)
CMSP: Supported (1)
A5/3: Encryption algorithm A5/3 available (1)
A5/2: Encryption algorithm A5/2 not available (0)

Thus, according to this example, a network apparatus 110 receives a first message comprising at least one UE capability. The first message arrives at the communication interface 210, which can identify the UE 105 which sent the message using a first communication link identifier (link ID), such as, for example, a Stand-Alone Dedicated Control Channel (SDCCH) link number. The UE capabilities received in the first message along with the first link ID are stored in the database. For example, the database 215 comprises one or more provisional capabilities tables such as the example shown in Table 2. The provisional capabilities table comprises a plurality of provisional capabilities records. Each provisional capabilities record comprises a link ID and at least one UE capability.

TABLE 2

Example provisional capabilities table

| | | | Provisional UE Capabilities | | | |
|---|---|---|---|---|---|---|
| Link ID | WiFi | GERAN Feature Package 1 | UMTS FDD | DTM | A5/1 Encryption Algorithm | ... Band 3 |
| 111 | Supported | Supported | Supported | Supported | Available | ... DCS 1800 supported |
| 112 | Not Supported | Not Supported | Not Supported | Supported | Not Available | ... DCS 1800 supported |

Further, according to this example, in order for the UE 105 to access the network resources of the network 115, the UE 105 sends a second message to the network apparatus 110 (for example, the MSC/VLR or MME) containing a UE ID (for example, an IMEI, IMEISV, MEID, or ESN.) For example, as described in 3GPP TS 24.008, during a Location Updating Procedure, the UE 105 sends an Identity Response message to the MSC/VLR or MME (examples of a network apparatus 110.) The Identity Response message contains a UE ID (for example, an IMEI or IMEISV.) In some instances, the second message contains a UE ID but does not contain any UE capabilities. In this case, when the second message arrives at the communications interface 210, the communications interface 210 can identify the UE 105 which sent the message using a second link ID such as, for example, an SDDCH link number.

The communications interface 210 sends the link ID to the database 215. The database 215 searches the provisional capabilities table, such as the example shown in Table 2, to see if the first link ID stored in a provisional capabilities record matches the second link ID. In an instance in which the first link ID and the second link ID match, the database 215 sends the first at least one UE capability from provisional capabilities record to the communications interface 210. The communications interface 210 then sends the UE ID along with the first at least one UE capability to the capabilities checking module 220.

As will be appreciated, the UE 105 may send UE capabilities to the network apparatus 110 using one or more messages, and the UE 105 may send the UE ID to the network apparatus 110 using one or more of the same or different messages. These messages may arrive in any order. According to example embodiments of the present invention, additional tables may be included in the database 215 to handle these and other cases.

As described above, according to this example, the network apparatus 110 receives one or more messages containing a UE ID and a first at least one UE capability from a UE 105. The network apparatus 110 may be configured to use the UE ID to obtain a type code associated the UE 105. For example, Table 3 shows the format of an IMEI according to 3GPP TS 23.003. As shown, the first 8 digits of an IMEI comprise a Type Allocation Code (TAC.)

TABLE 3

IMEI Format

| Field | Digits | Description |
|---|---|---|
| TAC | 8 | Type Allocation Code |
| SNR | 6 | Serial Number |
| Spare | 1 | Check digit |

According to some example embodiments, the database 215 is configured to store one or more expected capabilities lookup tables. Each expected capabilities lookup table comprises a plurality of expected capability records. Each expected capability record comprises a type code (for example, a TAC) and at least one UE capability. An example of an expected capabilities lookup table is shown in Table 4.

TABLE 4

Example expected capabilities lookup table

| | | Expected UE Capabilities | | | | |
|---|---|---|---|---|---|---|
| Type Code | WiFi | GERAN Feature Package 1 | UMTS FDD | DTM | A5/1 Encryption Algorithm | ... Band 3 |
| 12345678 | Supported | Supported | Supported | Supported | Available | ... DCS 1800 supported |
| 11223344 | Not Supported | Not Supported | Not Supported | Supported | Not Available | ... DCS 1800 supported |

According to this example, the capabilities checking module 220 may be configured to read the TAC (an example of a type code) from the first eight (8) digits of an IMEI (an example of a UE ID) and send the TAC to the database 215. The database 215 is configured to search for the TAC in an expected capabilities lookup table. If the TAC is found, the database 215 is configured to send the second at least one UE capability associated with the TAC to the capabilities checking module 220. The capabilities checking module 220 thus obtains a second at least one UE capability from the database 215. The network apparatus 110 (for example, the MSC/VLR or MME) is configured to compare the first at least one UE capability with the second at least one UE capability. If the first at least one UE capability and the second at least one UE capability are different, the UE ID (for example, the IMEI or IMEISV) may be considered counterfeit and the UE 105 may be considered unlicensed. When this is the case the network apparatus 110 is configured to send a notification.

According to some example embodiments, in an instance in which the first at least one UE capability and the second at least one UE capability are different, the network apparatus 110 (for example, the MSC/VLR or MME) is configured to send a notification, the notification comprising a warning message to a UE 105 that the UE 105 is configured with a counterfeit UE ID. According to this example, the warning message may include a text message, voice mail message, email message, and/or the like. The warning message may further comprise a human-readable message warning to the user of the UE 105 that the UE ID is counterfeit or fake.

As will be appreciated, in some cases more than one UE may be configured with the same UE ID. For example, the same UE ID may be in use by one licensed UE and one or more unlicensed UEs. In order to send the warning message to the correct, unlicensed, UE 105, according to some example embodiments, the network apparatus 110 is configured to obtain a subscriber ID (for example, an IMSI, MIN or MDN) associated with the UE 105 in order to deliver the warning message to the correct, unlicensed, UE 105. In this case, the network apparatus 110 may be configured to obtain the subscriber ID from, for example, a database 215, a subscriber database (for example a Home Subscriber Server (HSS) and/or Home Location Register (HLR)), and/or the like. According to some example embodiments, the network apparatus 110 may be configured to obtain the subscriber ID from one or more messages it receives from the UE 105. The subscriber ID and/or UE ID may thus be used by the network apparatus 110 to send the warning message to the correct, unlicensed, UE 105.

According to some example embodiments, in an instance in which the first at least one UE capability and the second at least one UE capability are different, the network apparatus 110 (for example, the MSC/VLR or MME) is configured to send a notification, the notification comprising a request to disable a subscriber profile associated with a UE 105. The request to disable the subscriber profile may be sent to a subscriber database (for example, an HLR or HSS.) If the subscriber profile is disabled, the UE 105 may not be allowed to access the network 115 except in certain cases such as, for example, in case of emergency.

As will be appreciated, in some cases more than one UE may be configured with the same UE ID. For example, the same UE ID may be in use by one licensed UE and one or more unlicensed UEs. According to some example embodiments, the network apparatus 110 may be configured to obtain a subscriber ID (for example, an IMSI, MIN or MDN) associated with the UE ID in order to correctly identify the subscriber profile to be disabled. The network apparatus 110 may be configured to obtain the subscriber ID from various sources, for example, a database 215, a subscriber database (for example an HSS and/or HLR), and/or the like. According to some example embodiments, network apparatus 110 may be configured to obtain the subscriber ID from one or more messages it receives from the UE 105. The network apparatus 110 may be configured to include the subscriber ID and the UE ID in a notification, the notification comprising a request to disable a subscriber profile associated with the UE ID (for example, an IMEI or IMEISV) and the subscriber ID (for example, an IMSI). The request to disable the subscriber profile may be sent to a subscriber database (for example, an HLR or HSS.) If the subscriber profile is disabled, the UE 105 may not be allowed to access the network 115 except in certain cases such as, in case of emergency.

According to some example embodiments, in an instance in which the first at least one UE capability and the second at least one UE capability are different, the network apparatus 110 (for example, the MSC/VLR or MME) is configured to send a notification, the notification comprising an indication that a UE 105 should not be allowed to access a network 115. According to this example, the network apparatus 110 may receive a CM Service Request message. If the network apparatus 110 determines that the UE 105 is using a counterfeit UE ID, the network apparatus may be configured to send an error message in response to the CM Service Request message, indicating that the UE 105 is denied access to the network 115. Alternatively, if the network apparatus 110 determines that the UE 105 is using a counterfeit UE ID, the network apparatus may be configured to send an error message in response to the CM Service Request message, indicating that the UE 105 should have limited access to the network 115.

Similarly, according to some example embodiments, the network apparatus 110 may receive a Setup message. If the network apparatus 110 determines that the UE 105 is using a counterfeit UE ID, the network apparatus 110 may be configured to send an error message in response to the Setup message, indicating that the UE 105 is denied access to the network 115. Alternatively, if the network apparatus 110 determines that the UE 105 is using a counterfeit UE ID, the network apparatus 110 may be configured to send an error message in response to the Setup message, indicating that the UE 105 should have limited access to the network 115.

As will be appreciated, according to some example embodiments, in an instance in which the first at least one UE capability and the second at least one UE capability are different, the network apparatus 110 may be configured to send more than one notification. For example, the network apparatus 110 may be configured to send a warning message to a UE 105, send a request to disable a subscriber profile associated with the UE 105 and/or send an indication that the UE 105 should not be allowed to access a network 115. As another example, the network apparatus 110 may be configured to send a warning message to the UE 105 and also send request to disable a subscriber profile associated with the UE 105. As another example, the network apparatus 110 may be configured to send a warning message to the UE 105 and also send an indication that the UE 105 should not be allowed to access a network 115. As another example, the network apparatus 110 may be configured to send a warning message to the UE 105 and also send an indication that the UE 105 should have limited access to a network 115. As another example, the network apparatus 110 may be configured to send a request to disable a subscriber profile associated a UE 105 and also send an indication that the UE 105 should not be allowed to access a network 115. As another example, the network apparatus 110 may be configured to send a request to disable a subscriber profile associated a UE 105 and also send an indication that the UE 105 should have limited access a network 115.

As will be appreciated, according to some example embodiments, in an instance in which the first at least one UE capability and the second at least one UE capability are different, the network apparatus 110 may be configured to take other measures to discourage, block or otherwise limit the use of the associated UE 105 in a network 115. For example, according to some example embodiments, the network apparatus 110 may comprise an HSS or HLR.

According to this example, the network apparatus 110 may receive a first message comprising a first at least one UE capability associated with a UE 105. The network apparatus 110 may be configured to compare the first at least one UE capability with a second at least one UE capability, stored, for example, in a database 215. In an instance in which the first at least one UE capability and the second at least one UE capability are different, the network apparatus 110 may be configured to disable a user profile associated with the UE 105. If the subscriber profile is disabled, the UE 105 may not be allowed to access the network 115.

Referring now to FIG. 3, FIG. 3 illustrates a flowchart according to an example method for the detection of unlicensed user equipment according to some example embodiments. In this regard, FIG. 3 illustrates operations that may be performed at a network apparatus 110. The operations illustrated in and described with respect to FIG. 3 may, for example, be performed by, with the assistance of, and/or under the control of one or more of the processor 200, memory 205, communication interface 210, database 215, or capabilities checking module 220. Operation 300 comprises receiving a first message comprising a first at least one user equipment capability. The processor 200, memory 205, communication interface 210, database 215, and/or capabilities checking module 220 may, for example, provide means for performing operation 300. Operation 305 comprises comparing the first at least one user equipment capability with a second at least one user equipment capability. The processor 200, memory 205, communication interface 219, database 215, and/or capabilities checking module 220 may, for example, provide means for performing operation 305. Operation 310 comprises sending a notification in an instance in which the first at least one user equipment capability and the second at least one user equipment capability are different. The processor 200, memory 205, communication interface 219, database 215, and/or capabilities checking module 220 may, for example, provide means for performing operation 310.

Referring now to FIG. 4, FIG. 4 illustrates a flowchart according to an example method for the detection of unlicensed user equipment according to some example embodiments. In this regard, FIG. 4 illustrates operations that may be performed at a network apparatus 110. The operations illustrated in and described with respect to FIG. 4 may, for example, be performed by, with the assistance of, and/or under the control of one or more of the processor 200, memory 205, communication interface 210, database 215, or capabilities checking module 220. Operation 400 comprises receiving a first message comprising a first at least one user equipment capability, wherein the first message is associated with a first communication link identifier. The processor 200, memory 205, communication interface 210, database 215, and/or capabilities checking module 220 may, for example, provide means for performing operation 400. Operation 405 comprises receiving a second message comprising a user equipment identity, wherein the second message is associated with a second communication link identifier. The processor 200, memory 205, communication interface 219, database 215, and/or capabilities checking module 220 may, for example, provide means for performing operation 405. Operation 410 comprises comparing the first communication link identifier with the second communication link identifier. The processor 200, memory 205, communication interface 219, database 215, and/or capabilities checking module 220 may, for example, provide means for performing operation 410. Operation 415 comprises obtaining a second at least one user equipment capability associated with the user equipment identity in an instance in which the first communication link identifier and the second communication link identifier match. The processor 200, memory 205, communication interface 219, database 215, and/or capabilities checking module 220 may, for example, provide means for performing operation 415. Operation 420 comprises comparing the first at least one user equipment capability with the second at least one user equipment capability. The processor 200, memory 205, communication interface 219, database 215, and/or capabilities checking module 220 may, for example, provide means for performing operation 420. Operation 425 comprises sending a notification in an instance in which the first at least one user equipment capability and the second at least one user equipment capability are different. The processor 200, memory 205, communication interface 219, database 215, and/or capabilities checking module 220 may, for example, provide means for performing operation 425.

Referring now to FIG. 5, FIG. 5 illustrates a flowchart according to an example method for the detection of unlicensed user equipment according to some example embodiments. In this regard, FIG. 5 illustrates operations that may be performed at a network apparatus 110. The operations illustrated in and described with respect to FIG. 5 may, for example, be performed by, with the assistance of and/or under the control of one or more of the processor 200, memory 205, communication interface 210, database 215, or capabilities checking module 220. Operation 500 comprises receiving a first message comprising a first at least one user equipment capability, wherein the first message is associated with a first communication link identifier. The processor 200, memory 205, communication interface 210, database 215, and/or capabilities checking module 220 may, for example, provide means for performing operation 500. Operation 505 comprises receiving a second message comprising a user equipment identity, wherein the second message is associated with a second communication link identifier. The processor 200, memory 205, communication interface 219, database 215, and/or capabilities checking module 220 may, for example, provide means for performing operation 505. Operation 510 comprises comparing the first communication link identifier with the second communication link identifier. The processor 200, memory 205, communication interface 219, database 215, and/or capabilities checking module 220 may, for example, provide means for performing operation 510. Operation 515 comprises obtaining a second at least one user equipment capability associated with the user equipment identity in an instance in which the first communication link identifier and the second communication link identifier match. The processor 200, memory 205, communication interface 219, database 215, and/or capabilities checking module 220 may, for example, provide means for performing operation 515. Operation 520 comprises comparing the first at least one user equipment capability with the second at least one user equipment capability. The processor 200, memory 205, communication interface 219, database 215, and/or capabilities checking module 220 may, for example, provide means for performing operation 520. Operation 525 comprises sending a notification in an instance in which the first at least one user equipment capability and the second at least one user equipment capability are different, the notification comprising a warning message to a user equipment associated with the user equipment identity, the warning message comprising an indication that the user equipment identity is counterfeit. The processor 200, memory 205, communication interface 219, database 215, and/or capabilities checking module 220 may, for example, provide means for performing operation 525.

Referring now to FIG. 6, FIG. 6 illustrates a flowchart according to an example method for the detection of unlicensed user equipment according to some example embodiments. In this regard, FIG. 6 illustrates operations that may be performed at a network apparatus 110. The operations illustrated in and described with respect to FIG. 6 may, for example, be performed by, with the assistance of, and/or under the control of one or more of the processor 200, memory 205, communication interface 210, database 215, or capabilities checking module 220. Operation 600 comprises receiving a first message comprising a first at least one user equipment capability, wherein the first message is associated with a first communication link identifier. The processor 200, memory 205, communication interface 210, database 215, and/or capabilities checking module 220 may, for example, provide means for performing operation 600. Operation 605 comprises receiving a second message comprising a user equipment identity, wherein the second message is associated with a second communication link identifier. The processor 200, memory 205, communication interface 219, database 215, and/or capabilities checking module 220 may, for example, provide means for performing operation 605. Operation 610 comprises comparing the first communication link identifier with the second communication link identifier. The processor 200, memory 205, communication interface 219, database 215, and/or capabilities checking module 220 may, for example, provide means for performing operation 610. Operation 615 comprises obtaining a second at least one user equipment capability associated with the user equipment identity in an instance in which the first communication link identifier and the second communication link identifier match. The processor 200, memory 205, communication interface 219, database 215, and/or capabilities checking module 220 may, for example, provide means for performing operation 615. Operation 620 comprises comparing the first at least one user equipment capability with the second at least one user equipment capability. The processor 200, memory 205, communication interface 219, database 215, and/or capabilities checking module 220 may, for example, provide means for performing operation 620. Operation 625 comprises sending a notification in an instance in which the first at least one user equipment capability and the second at least one user equipment capability are different, the notification comprising a request to disable a subscriber profile associated with the user equipment identity. The processor 200, memory 205, communication interface 219, database 215, and/or capabilities checking module 220 may, for example, provide means for performing operation 625.

Referring now to FIG. 7, FIG. 7 illustrates a flowchart according to an example method for the detection of unlicensed user equipment according to some example embodiments. In this regard, FIG. 7 illustrates operations that may be performed at a network apparatus 110. The operations illustrated in and described with respect to FIG. 7 may, for example, be performed by, with the assistance of, and/or under the control of one or more of the processor 200, memory 205, communication interface 210, database 215, or capabilities checking module 220. Operation 700 comprises receiving a first message comprising a first at least one user equipment capability, wherein the first message is associated with a first communication link identifier. The processor 200, memory 205, communication interface 210, database 215, and/or capabilities checking module 220 may, for example, provide means for performing operation 700. Operation 705 comprises receiving a second message comprising a user equipment identity, wherein the second message is associated with a second communication link identifier. The processor 200, memory 205, communication interface 219, database 215, and/or capabilities checking module 220 may, for example, provide means for performing operation 705. Operation 710 comprises comparing the first communication link identifier with the second communication link identifier. The processor 200, memory 205, communication interface 219, database 215, and/or capabilities checking module 220 may, for example, provide means for performing operation 710. Operation 715 comprises obtaining a second at least one user equipment capability associated with the user equipment identity in an instance in which the first communication link identifier and the second communication link identifier match. The processor 200, memory 205, communication interface 219, database 215, and/or capabilities checking module 220 may, for example, provide means for performing operation 715. Operation 720 comprises comparing the first at least one user equipment capability with the second at least one user equipment capability. The processor 200, memory 205, communication interface 219, database 215, and/or capabilities checking module 220 may, for example, provide means for performing operation 720. Operation 725 comprises sending a notification in an instance in which the first at least one user equipment capability and the second at least one user equipment capability are different, the notification comprising an indication that a user equipment associated with the user equipment identity should not be allowed to access a network. The processor 200, memory 205, communication interface 219, database 215, and/or capabilities checking module 220 may, for example, provide means for performing operation 725.

Referring now to FIG. 8, FIG. 8 illustrates a flowchart according to an example method for the detection of unlicensed user equipment according to some example embodiments. In this regard, FIG. 8 illustrates operations that may be performed at a network apparatus 110. The operations illustrated in and described with respect to FIG. 8 may, for example, be performed by, with the assistance of, and/or under the control of one or more of the processor 200, memory 205, communication interface 210, database 215, or capabilities checking module 220. Operation 800 comprises receiving a first message comprising a first at least one user equipment capability, wherein the first message is associated with a first communication link identifier. The processor 200, memory 205, communication interface 210, database 215, and/or capabilities checking module 220 may, for example, provide means for performing operation 800. Operation 805 comprises receiving a second message comprising a user equipment identity, wherein the second message is associated with a second communication link identifier. The processor 200, memory 205, communication interface 219, database 215, and/or capabilities checking module 220 may, for example, provide means for performing operation 805. Operation 810 comprises comparing the first communication link identifier with the second communication link identifier. The processor 200, memory 205, communication interface 219, database 215, and/or capabilities checking module 220 may, for example, provide means for performing operation 810. Operation 815 comprises obtaining a second at least one user equipment capability associated with the user equipment identity in an instance in which the first communication link identifier and the second communication link identifier match. The processor 200, memory 205, communication interface 219, database 215, and/or capabilities checking module 220 may, for example, provide means for performing operation 815. Operation 820 comprises comparing the first at least one user equipment capability with the second at least one user equipment capability. The processor 200, memory 205, communication interface 219, database 215, and/or capabilities checking module 220 may, for example, provide means for performing operation 820. Operation 825 comprises sending a notification in an instance in which the first at least one user equipment capability and the second at least one user equipment capability are different, the notification comprising an indication that a user equipment associated with the user equipment identity should have limited access to a network. The processor 200, memory 205, communication interface 219, database 215, and/or capabilities checking module 220 may, for example, provide means for performing operation 825.

FIGS. 3-8 each illustrate a flowchart of a system, method, and computer program product according to some example embodiments. It will be understood that each block of the flowcharts, and combinations of blocks in the flowcharts, may be implemented by various means such as, for example, hardware and/or a computer program product comprising one or more computer-readable mediums including computer readable program instructions stored thereon. For example, one or more of the procedures described herein may be embodied by computer program instructions of a computer program product. In this regard, the computer program product(s) which embody the procedures described herein may be stored on one or more memory devices of a mobile terminal, server, or other computing device (for example, in the memory 205) and executed by a processor in the computing device (for example, by the processor 200). In some example embodiments, the computer program instructions comprising the computer program product(s) which embody the procedures described above may be stored on memory devices of a plurality of computing devices. As will be appreciated, any such computer program product may be loaded onto a computer or other programmable apparatus (for example, a network apparatus 110) to produce a machine, such that the computer program product including the instructions which execute on the computer or other programmable apparatus creates means for implementing the functions specified in the flowchart block(s). Further, the computer program product may comprise one or more computer-readable memories on which the computer program instructions may be stored such that the one or more computer-readable memories can direct a computer or other programmable apparatus to function in a particular manner, such that the computer program product may comprise an article of manufacture which implements the function specified in the flowchart block(s). The computer program instructions of one or more computer program products may also be loaded onto a computer or other programmable apparatus (for example, a network apparatus 110) to cause a series of operations to be performed on the computer or other programmable apparatus to produce a computer-implemented process such that the instructions which execute on the computer or other programmable apparatus implement the functions specified in the flowchart block(s).

Accordingly, blocks of the flowcharts support combinations of means for performing the specified functions. It will also be understood that one or more blocks of the flowcharts, and combinations of blocks in the flowcharts, may be implemented by special purpose hardware-based computer systems which perform the specified functions, or combinations of special purpose hardware and computer program product(s).

The above described functions may be carried out in many ways. For example, any suitable means for carrying out each of the functions described above may be employed to carry out embodiments of the invention. According to some example embodiments, a suitably configured processor (for example, the processor 200) may provide all or a portion of the elements. In other example embodiments, all or a portion of the elements may be configured by and operate under control of a computer program product. The computer program product for performing the methods of some example embodiments may include a computer-readable storage medium (for example, the memory 205), such as the non-volatile storage medium, and computer-readable program code portions, such as a series of computer instructions, embodied in the computer-readable storage medium.

Many modifications and other embodiments of the inventions set forth herein will come to mind to one skilled in the art to which these inventions pertain having the benefit of the teachings presented in the foregoing descriptions and the associated drawings. Therefore, it is to be understood that the embodiments of the invention are not to be limited to the specific embodiments disclosed and that modifications and other embodiments are intended to be included within the scope of the invention. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the invention. In this regard, for example, different combinations of elements and/or functions than those explicitly described above are also contemplated within the scope of the invention. Although specific terms are employed herein, they are used in a generic and descriptive sense only and not for purposes of limitation.

What is claimed is:

1. A method comprising:
   receiving a first message associated with a first communication link identifier, the first message comprising information indicative of at least one capability of a user equipment;
   receiving a second message associated with a second communication link identifier, the second message comprising a user equipment identity;
   comparing the first communication link identifier with the second communication link identifier;
   obtaining, in response to identifying a match between the first communication link identifier and the second communication link identifier, a previously stored capability of the user equipment associated with the user equipment identity;
   comparing the at least one capability of the user equipment with the previously stored capability of the user equipment;
   determining, based on the comparison of the at least one capability of the user equipment with the previously stored capability of the user equipment and the comparison of the first communication link identifier and the second communication link identifier, whether the user equipment is likely to be unlicensed; and
   sending a notification, when the comparing indicates that the user equipment is likely to be unlicensed, the notification including a request to disable a subscriber profile associated with the user equipment identity.

2. The method of claim 1, wherein the first message further comprises a mobile station classmark, wherein the mobile station classmark comprises the at least one capability of the user equipment.

3. The method of claim 1, wherein the sending of the notification further comprises sending a warning message to the user equipment associated with the user equipment identity, the warning message comprising an indication that the user equipment identity is counterfeit.

4. The method of claim 1, wherein the sending of the notification further comprises sending an indication that the user equipment associated with the user equipment identity should not be allowed to access a network.

5. The method of claim 1, wherein the sending of the notification further comprises sending an indication that the user equipment associated with the user equipment identity should have limited access to a network.

6. An apparatus, comprising: at least one processor and at least one memory including computer program code, the at least one memory and the computer program code configured to, with the at least one processor, cause the apparatus at least to:
  receive a first message associated with a first communication link identifier, the first message comprising information indicative of at least one capability of a user equipment;
  receive a second message, associated with a second communication link identifier, the second message comprising a user equipment identity;
  compare the first communication link identifier with the second communication link identifier;
  obtain, in response to identifying a match between the first communication link identifier and the second communication link identifier, a previously stored capability of the user equipment associated with the user equipment identity;
  compare the at least one capability of the user equipment with the previously stored capability of the user equipment;
  determine, based on the comparison between the at least one capability of the user equipment and the previously stored capability of the user equipment and the comparison of the first communication link identifier and the second communication link identifier, whether the user equipment is likely to be unlicensed; and
  send a notification, when the compare indicates that the user equipment is likely to be unlicensed, the notification including a request to disable a subscriber profile associated with the user equipment identity.

7. The apparatus of claim 6, wherein the first message further comprises a mobile station classmark, wherein the mobile station classmark comprises the at least one capability of the user equipment.

8. The apparatus of claim 6, wherein the at least one memory including computer program code is further configured to, with the at least one processor, cause the apparatus to at least send a notification at least in part by sending a warning message to the user equipment associated with the user equipment identity, the warning message comprising an indication that the user equipment identity is counterfeit.

9. The apparatus of claim 6, wherein the at least one memory including computer program code is further configured to, with the at least one processor, cause the apparatus to at least send a notification at least in part by sending an indication that the user equipment associated with the user equipment identity should not be allowed to access a network.

10. The apparatus of claim 6, wherein the at least one memory including computer program code is further configured to, with the at least one processor, cause the apparatus to at least send a notification at least in part by sending an indication that the user equipment associated with the user equipment identity should have limited access to a network.

11. A computer program product comprising at least one non-transitory computer-readable storage medium having computer-executable program code instructions stored therein, the computer-executable program code instructions comprising:
  receive a first message, associated with a first communication link identifier, comprising information indicative of at least one capability of a user equipment;
  receive a second message, associated with a second communication link identifier, comprising a user equipment identity;
  compare the first communication link identifier with the second communication link identifier;
  obtain, in response to identifying a match between the first communication link identifier and the second communication link identifier, a previously stored capability of the user equipment associated with the user equipment identity;
  compare the at least one capability of the user equipment with the previously stored capability of the user equipment;
  determine, based on the comparison between the at least one capability of the user equipment and the previously stored capability of the user equipment and comparison of the first communication link identifier and the second communication link identifier, whether the user equipment is likely to be unlicensed; and
  send a notification, when the compare indicates that the user equipment is likely to be unlicensed, the notification including a request to disable a subscriber profile associated with the user equipment identity.

12. The computer program product of claim 11, wherein the first message further comprises a mobile station classmark, wherein the mobile station classmark comprises the at least one capability of the user equipment.

13. The computer program product of claim 11, wherein the computer program product further comprises send the notification at least in part by sending a warning message to the user equipment associated with the user equipment identity, the warning message comprising an indication that the user equipment identity is counterfeit.

14. The computer program product of claim 11, wherein the computer program product further comprises send the notification at least in part by sending an indication that the user equipment associated with the user equipment identity should not be allowed to access a network.

* * * * *